Patented Sept. 22, 1931

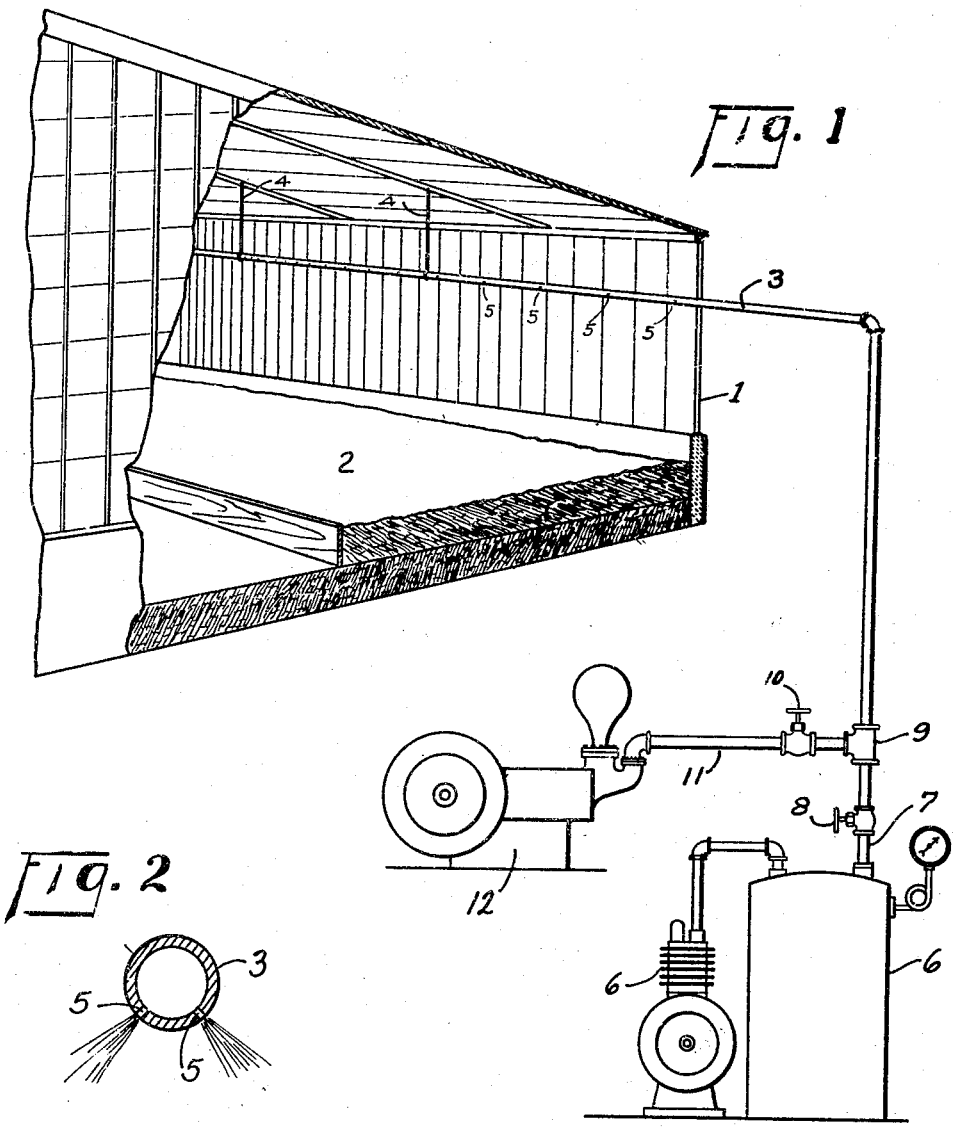

1,824,563

UNITED STATES PATENT OFFICE

GEORGE WILEY O'CONNOR, OF GRAND RAPIDS, MICHIGAN

GREENHOUSE AERATOR

Application filed September 24, 1928. Serial No. 307,918.

This invention relates to an apparatus for aerating greenhouses and the like.

The main objects of this invention are to provide an improved apparatus for delivering a uniformly distributed supply of fresh air to all parts of a greenhouse; to provide an apparatus by the use of which the growing plants in a greenhouse are maintained in a healthy and vigorous state; to provide an apparatus by the use of which the customary yield of greenhouse plants may be increased on the average of 50%; to provide an aerating apparatus which will permit the plants in a greenhouse to be sprayed by overhead sprinkling systems, and to provide an apparatus which may be utilized to lower the temperature in greenhouses on hot sunny days.

An illustrative embodiment of this invention is shown in the accompanying drawings, in which:

Fig. 1 is a perspective view, somewhat diagrammatic, of a greenhouse equipped with my improved apparatus.

Fig. 2 is an enlarged transverse sectional view of the air distributing pipe.

Greenhouse growing is particularly subject to plant disease, due very largely to excessive humidity and stagnant air which decreases resistance to disease.

Heretofore greenhouse growers have experienced great difficulty in the growing of plants and vegetables particularly tomatoes, due to the plants and vines being attacked by mold and other plant diseases. This has been particularly true where they have attempted to use overhead sprinkling systems.

Many greenhouse owners, after having equipped their house with overhead sprinklers, were forced to discontinue their use on account of mold, etc. attacking their plants, and were forced to return to the hand watering of the plants by a hose, such watering being confined to the ground underneath the plants and not on the plant leaves. Hand watering of course, is burdensome and expensive, and on account of being confined to the ground and not on the plants themselves, such method of growing does not simulate outdoor condition as provided by nature.

In outdoor growing, overhead sprinkling is eminently successful but the reason thereof is that the plants are in the open air and the breezes evaporate the excess moisture which cannot be taken up by the plants.

Therein lies the trouble with indoor overhead sprinkling. By reason of the enclosed greenhouse, two essential things are lacking to make healthy plants. One is the lack of moving currents of air which evaporate excess moisture, and the other is the absence of abundant fresh air for the plants to breathe. Fresh air is just as essential to making strong healthy plants which resist disease, as it is to human beings.

By the use of my improved apparatus, nature's conditions are closely approximated, and by reason of the human control of such conditions, greatly increased yields are secured, in many cases 50% and more.

In the construction shown in the drawings a greenhouse 1 has plant beds 2 arranged in the usual manner, and is provided with a pipe 3 suspended from the roof supports by hanger 4, in spaced relation above the beds 2, which extends substantially the entire length of the greenhouse. The pipe 3 has a plurality of discharge orifices 5 spaced along it, preferably in uniform manner, and positioned so that air discharged therefrom under pressure, will strike plants growing in the beds 2. Means are provided for supplying air under pressure to the pipe 3 and comprise an air compressor unit 6 connected by a pipe 7 through a control valve 8 to the pipe 3. The pipe 3 may also be utilized as an overhead water sprinkler, and connection is made through a T 9 control valve 10 and pipe 11 to a water pumping unit 12.

In the operation of this apparatus, the valve 8 is closed and the valve 10 opened. The water pump unit 12 is then started and the plants thoroughly sprinkled in the same manner as though they had been rained upon. This sprinkling is preferably done in the early evening. Then in the early morning, before the sun becomes hot, the air compressor unit is started, the valve 10 being closed and the valve 8 opened.

The compressed air blows the water out of the line and thereafter air is discharged out of the orifice 5 down onto the plants in much the same manner as the breezes blow over the plants. The fresh air thus supplied is evenly and uniformly distributed throughout the greenhouse, and will very quickly evaporate the excess moisture from the plants, at the same time imparting sufficient movement to the leaves and stems thereof to produce a strong and healthy condition similar to plants grown out in the open.

Another great advantage of using this apparatus is that the forced circulation of air within the greenhouse will distribute the pollen from flower to flower, which distribution is necessary for the successful breeding of plants. Furthermore, such forced circulation can be utilized to reduce the temperature in greenhouses during the hot summer months without resorting to the opening of a great number of overhead ventilators.

Although but one specific embodiment of this invention has been herein shown and described, it will be understood that numerous details of the construction shown may be altered or omitted without departing from the spirit of this invention as defined by the following claims.

I claim:

1. A greenhouse having plant beds therein, a discharge pipe in spaced relation above said plant beds, said pipe having discharge orifices for directing fluid discharged therefrom down onto plants in said plant beds, and means for alternately or simultaneously supplying water and air under pressure to said discharge pipe for sprinkling and aerating respectively, plants in said plant beds.

2. A greenhouse having plant beds therein, a discharge pipe in spaced relation above the plant beds, said pipe having discharge orifices for directing fluid discharged therefrom down onto plants in said plant beds, a water pump having a valve-controlled discharge into said pipe, an air pump having a valve-controlled discharge into said pipe, for supplying water and air respectively to said pipe and the plants in the plant beds, said pumps being in juxtaposition and separately and simultaneously operably controlled at the greenhouse.

In testimony whereof I have hereunto set my hand at Grand Rapids, Michigan this 4th day of September, 1928.

GEORGE WILEY O'CONNOR.